United States Patent [19]

Altman

[11] E Re. 28,515

[45] Reissued Aug. 12, 1975

[54] PHOTOGRAPHIC PRODUCTS FOR DIRECT OBSERVATION AND OPTICAL PROJECTION, AND PHOTOGRAPHIC PROCESSES FOR THEIR PRODUCTION AND UTILIZATION

[76] Inventor: Gerald Altman, 41 Westminster Rd., Newton Centre, Mass. 02154

[22] Filed: July 15, 1974

[21] Appl. No.: 488,544

Related U.S. Patent Documents

Reissue of:

[64] Patent No.: 3,802,884
Issued: Apr. 9, 1974
Appl. No.: 225,187
Filed: Feb. 10, 1972

U.S. Applications:

[63] Continuation of Ser. No. 734,039, June 3, 1968, abandoned, which is a continuation-in-part of Ser. No. 655,714, July 6, 1967, abandoned.

[52] U.S. Cl. ..... 96/67; 96/84 R; 350/160 LC
[51] Int. Cl. ..... G03c 1/78; G02f 1/36
[58] Field of Search ..... 96/67, 84 R; 350/160 LC

[56] References Cited

UNITED STATES PATENTS 3,576,364 4/1971 Zanoni..... 350/160 LC X
3,592,527 7/1971 Conners et al. ..... 350/160 LC
3,697,297 10/1972 Churchill et al..... 350/160 LC X

*Primary Examiner*—Ronald H. Smith
*Assistant Examiner*—Alfonso T. Suro Pico
*Attorney, Agent, or Firm*—Morse, Altman, Oates & Bello

[57] ABSTRACT

[A visual presentation sheet is provided with an image component and a liquid crystal component. At room temperature, the liquid crystal component diffuses incident light so that the image stratum is visible by direct observation. At elevated temperature, the liquid crystal component clears to enable optical projection of the image component.]

*A photographic sheet is provided with an image stratum and a liquid crystal stratum. A process is provided: by which, at a first energy level, the liquid crystal stratum diffuses incident light so that the image stratum is visible by direct observation; and by which, at a second energy level, the liquid crystal stratum clears to enable optical projection of the image stratum. In a first embodiment, thermal energy is applied. In a second embodiment, electrical energy is applied.*

15 Claims, 5 Drawing Figures

PHOTOGRAPHIC PRODUCTS FOR DIRECT OBSERVATION AND OPTICAL PROJECTION, AND PHOTOGRAPHIC PROCESSES FOR THEIR PRODUCTION AND UTILIZATION

Matter enclosed in heavy brackets [ ] appears in the original patent but forms no part of this reissue specification; matter printed in italics indicates the additions made by reissue.

---

*RELATED APPLICATIONS*

[This is a continuation, of application Serial No. 734,039, filed June 3, 1968 now abandoned, a continuation-in-part of Serial No. 655,714, filed July 6, 1967, now U.S. Pat. No. 3,525,566.]

*This application is a continuation of copending application Ser. No. 734,039, filed June 3, 1968 (now abandoned) which in turn is a continuation-in-part of copending application Ser. No. 655,714, filed July 6, 1967 (now abandoned). This application also is related to application Ser. No. 747,339, filed July 24, 1968 (now U.S. Pat. No. 3,525,566, issued Aug. 25, 1970), which is a continuation-in-part of aforementioned application Ser. No. 655,714, filed July 6, 1967 (now abandoned).*

BACKGROUND AND SUMMARY OF THE INVENTION

The present invention relates to image presentation and, more particularly, to products and processes involving photographic images that are adapted for both direct observation and optical projection. Conventionally, a photographic presentation that is intended for direct observation is associated with a diffuse reflecting distribution, by which illuminating light is directed to an observer's eyes. Conventionally a photographic presentation that is intended for optical projection is associated with a transparent support that permits condensed light to be directed through the presentation toward a viewing screen. Under various circumstances, it is desired that a single presentation permit both direct observation and optical projection.

The primary object of the present invention is the provision of a visual product comprising a presentation distribution for displaying an image and a liquid crystal distribution having a diffuse reflective state by which the image may be observed directly and a clear state by which the image may be projected. Generally, diffuse reflectors provide a myriad of randomly oriented, reflecting facets, which in one form are defined by the surfaces of minute transparent crystals that scatter incident rays of light at random by both external and internal reflection. The contemplated combination of image and liquid crystal, in one form, is mounted on a clear base that permits diascopic projection and, in another form, is mounted on a metallic reflecting base, the metal character of which is obscured by the liquid crystal when the presentation is observed directly but is a specular backing for projection purposes when the liquid crystal is clear.

Other objects of the present invention will in part be obvious and will in part appear hereinafter.

The invention accordingly comprises the products and processes having the components, steps and interrelationships, which are presented in the accompanying disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings wherein.

DETAILED DESCRIPTION

Generally, each of the products disclosed specifically below is in the form of an integrated sheet comprising an assemblage of contiguous representation and liquid crystal components. In one form, the representation component is composed of a photographic medium that per se has physical and chemical characteristics that are well known in the art. Also the liquid crystal component per se has physical and chemical characteristics that are well known in the art. The photographic component may be characterized by any of a great variety of compositions, some of which are described specifically below. The liquid crystal component, for example, is characterized by a composition having a crystalline phase on one side of a critical temperature and an isotropic state on the other side of the critical temperature. The dimensions of the crystal phase are such that the crystal domain are too small for resolution by the human eye. As is well known, such liquid crystals generally are organic compounds that are classified by smectic, nematic and cholesteric mesophases at room temperature. Accordingly, for the purposes of the present invention, the specific chemical composition of the liquid crystal is immaterial, the present requirement being merely a selectivity between crystalline and amorphic states from the optical standpoint of diffusivity and clarity as a function of applied energy. The chemistry of liquid crystals is described in detail in G. W. Gray, Molecular Structure and the Properties of Liquid Crystals, 1962, The Academic Press, New York. One such liquid crystal is microcrystalline wax, which is in common use in tallow candles, wax paper, paper cup coatings, etc. Such a material is described in U.S. Pat. No. 3,379,550, issued on Apr. 23, 1968 in the name of John Podlipnik for Paraffin-Microcrystalline Wax Composition.

Figure 1:
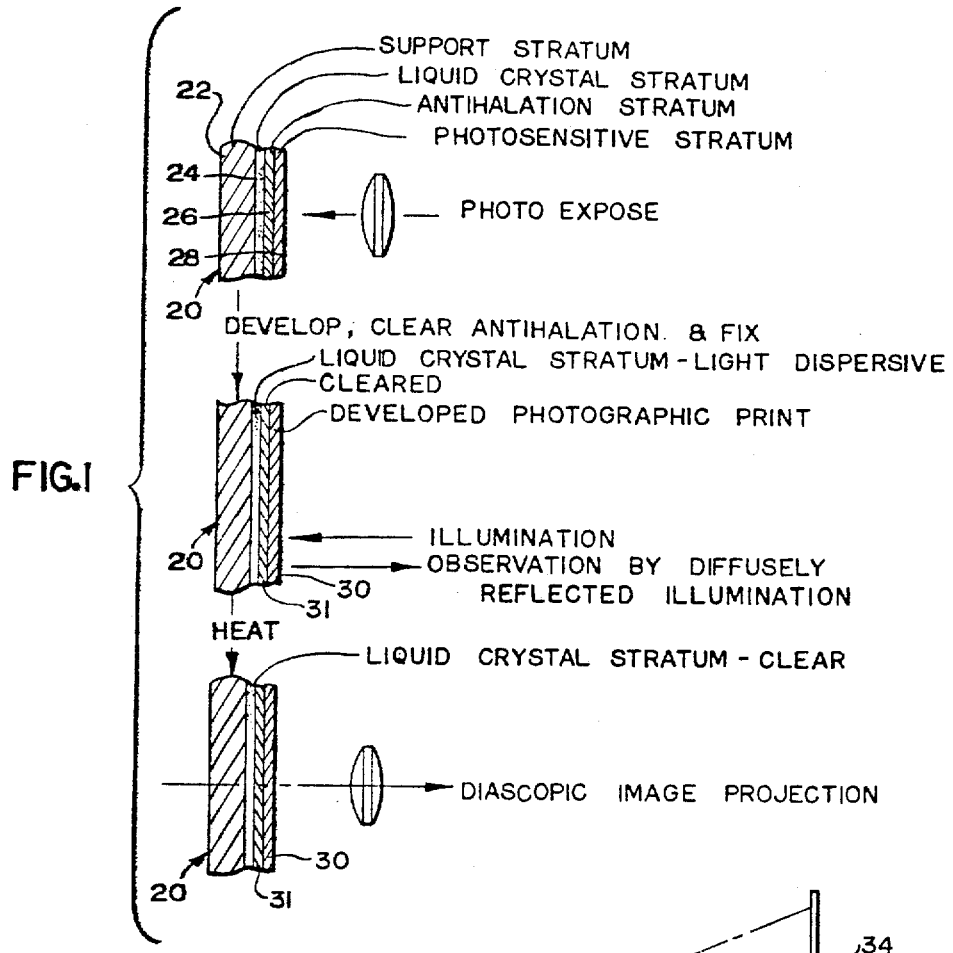
FIG. 1 illustrates a process for producing a photographic product that is adapted for both direct observation and diascopic projection.

Sheet 20 of FIG. 1 comprises, in laminated sequence, a transparent base stratum 22, a liquid crystal stratum 24, an initially opaque antihalation stratum 26 and a photosensitive stratum 28. Photoexposure of photosensitive stratum 28 produces a visible print 30 and clears the antihalation stratum as at 31. This print has continuous tone, being characterized by the usual characteristic (H and D) curve (density plotted against log exposure) with transverse upper and lower extreme portions that are outwardly and oppositely directed and a generally oblique intermediate portion, the slope of which is designated by gamma.

Details of the materials of the strata of sheet 20 are as follows. Base stratum 22 is composed of a clear plastic, for example, a cellulosic polymer such as cellulose nitrate, cellulose propionate or cellulose butyrate. Liquid crystal stratum 24 contains a low melting microcrystalline material, for example, a hydrocarbon wax having a melting point about 50°F. above room temperature, that provides a milky white appearance when solid at room temperature and a clear transparent character when heated above its relatively low melting point.

Antihalation stratum 26 is composed of a polar acting dye which clears in acid or alkali, for example, phenophthalene, Acid blue black (Color Index 246) or Acid magenta (Color Index 692), dispersed in a polymer, for example, as ester such as cellulose acetate. Suitable antihalation compositions are disclosed in U.S. Pat. No. 2,322,006, issued on June 15, 1943, in the name of Scheuring S. Fierke et al., for Photographic Filter and Antihalation Layer. Photosensitive stratum 28 is shown as being a silver halide emulsion. In such an emulsion, one or more of the silver halides, of which silver chloride, silver bromide and silver iodide are examples, are dispersed in a suitable colloidal material, such as gelatine, agar, albumin, casein, collodion or cellulosic ester. In use, photosensitive stratum 28, after photoexposure to provide a latent image, is developed by silver reduction and fixed by silver halide dissolution in an alkaline environment. The developer generally is alkali active, i.e., active only in alkaline solution, so that its development is accompanied by clearing of antihalation stratum 26. Examples of developers of this type are pyrogallol, hydroquinone, metol, amidol, paraaminophenol and glycin. The fixing agent, for example, is a silver halide solvent such as sodium thiosulfate or sodium thiocyanate. The alkali, for example, is an alkali metal base such as sodium or potassium hydroxide or a nitrogenous base such as ammonium hydroxide or hydroxylamine.

One specific example of the product and process of FIG. 1 involves the following. In the specific product of FIG. 1; stratum 22 is composed of glass approximately 0.0005 inch thick; liquid crystal stratum 24 includes a microcrystalline wax sub-stratum approximately 0.001 inch thick and a glass sub-stratum approximately 0.002 inch thick, which cooperates with stratum 22 to keep the liquid crystal stratum confined at all temperatures; antihalation stratum 26, which is composed of an acid azo dye, Methyl red, dispersed in cellulose acetate, is approximately 0.001 inch thick; and silver halide stratum 28 is a moderately high speed, gelatino iodobromide emulsion that is approximately 0.001 inch thick. After photostratum 28, the foregoing specific product is processed in the following sequence of steps. The photoexposed product is developed in the following solution for 3 minutes at 20°C.

| | | |
|---|---|---|
| Water | cc | 3000 |
| Metol | g | 3 |
| Sodium sulfite | g | 44 |
| Hydroquinone | g | 12 |
| Sodium Carbonate | g | 36 |
| Potassium bromide | g | 2 |

During development the antihalation layer clears and a print becomes visible in the photosensitive stratum. After washing for 10 minutes, fixing is effected by immersion in the following solution for 5 minutes at 20°C.

| | | |
|---|---|---|
| Water | cc | 3000 |
| Sodium thiosulfate | g | 240 |
| Sodium sulfite | g | 15 |
| Acetic acid (28%) | cc | 75 |
| Borax | g | 14.5 |
| Potassium alum | g | 15 |

After washing for 10 minutes and drying, the resulting print is of good quality for both direct observation and diascopic projection.

Figure 2:
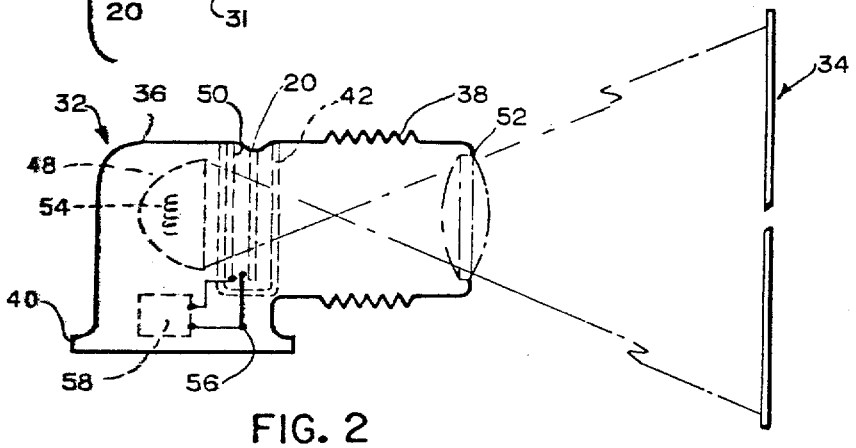
FIG. 2 illustrates a projection device adapted for use with the product of FIG. 1.

The projection system of FIG. 2 is designed primarily for the photographic product of FIG. 1, i.e., sheet 20, including photographic print 30. This sheet is inserted into projector 32 for imaging on a relatively remote projection screen 34 of the type having dispersed metallic particles, glass spheres or white pigment as an image viewing matrix. Projector 32 includes a unitary housing 36 having a forward portion and a rearward portion that are intermediately connected by a bellows 38 to provide a light-tight chamber therewithin. The forward portion is movable with respect to the base by suitable means not shown. Mounted within the housing is a heat control chamber 42 having front and rear radiation (light and infrared) transmitting windows. Within the chamber, photographic sheet 20 is positioned by a suitable frame (not shown). The remaining components of projector 32, which are suitably affixed within the housing, include an illumination source 48, a variable density infrared window 50 and an objective lens 52. Illumination source 48 includes a sealed lamp containing a medial filament 54, a rearward reflector and a focusing lens, by which the solid angle of a converging light cone is determined. Preferably the adjustment of illumination source 48 is such that the condensed flux cross-section of light generated by filament 54 approximately fills the stop of lens 52. Projecting into chamber 42 is a heat sensor 56 which controls a suitable power supply and control circuit 58 for variable density filter 50. The infrared energy generated by filament 54 maintains chamber 42 at a temperature of the order of 150° under the precision control of heat sensor 56, variable density filter 50 and electronic circuit 58. Thus when the developed reflection print of FIG. 1 is inserted into chamber 42, it is transformed into a transparency slide by virtue of the clearing of liquid crystal stratum 24 as a result of temperature increase.

Figure 3:
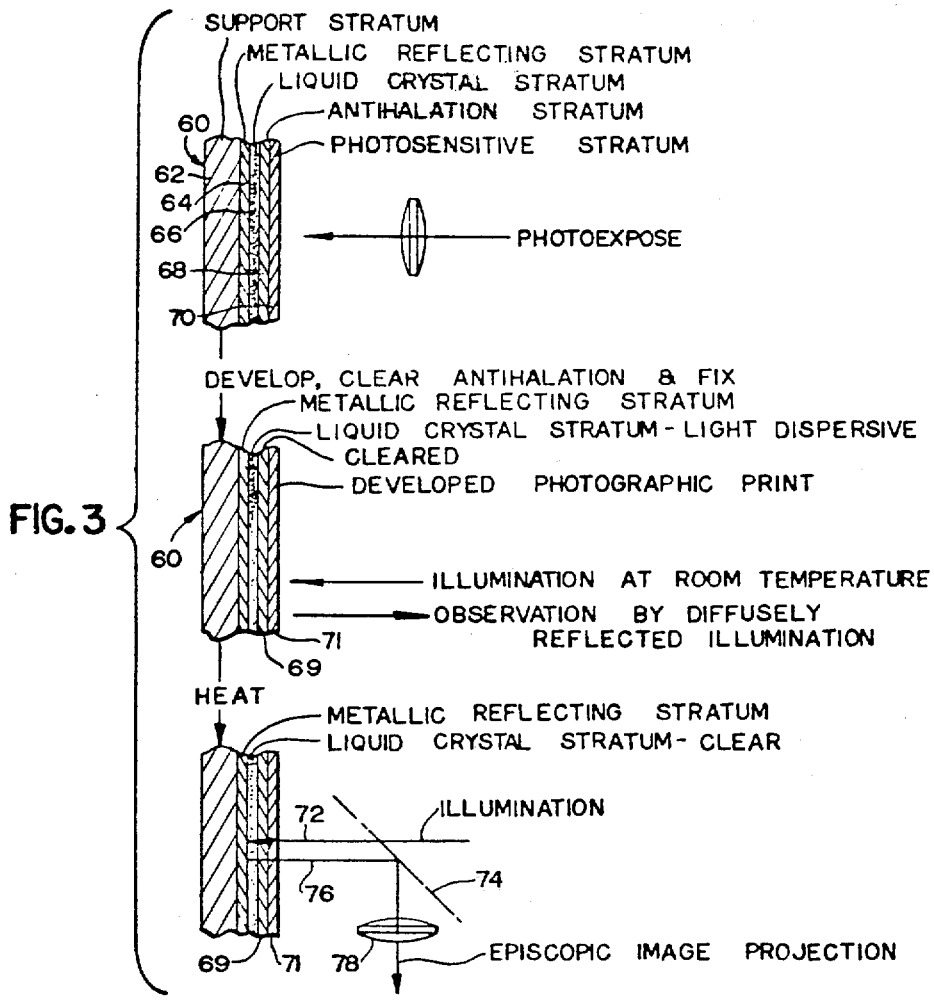
FIG. 3 illustrates a process for producing a photographic product that is adapted for both direct observation and episcopic projection.

The product of FIG. 3, shown generally at 60, includes in laminated sequence a support stratum 62, a metallic reflecting stratum 64, a liquid crystal stratum 66, an antihalation stratum 68 and a photosensitive stratum 70. Support stratum 62, liquid crystal stratum 66, antihalation stratum 68 and photosensitive stratum are like their counterparts 24, 26 and 28 in FIG. 1. Metallic reflecting stratum 64 is in the form of an evaporated silver or aluminum coat having a thickness within the range from 500 to 1,500 Angstrom units. In the specific example of the process involving the product of FIG. 3, details of the materials and steps are identical to those of the foregoing specific example of FIG. 1.

Following development, clearing of the antihalation stratum as at 69 and fixing at room temperature as at 71, the print of FIG. 3 is observable as a reflection print in terms of diffuse light. Alternatively, at an elevated temperature of the order of 150°F., liquid crystal stratum 66 clears and the print may be projected episcopically in terms of condensed incident light 72, which is transmitted through a suitable beam splitter 74, and in terms of condensed reflected light 76, which is reflected by beam splitter 74 and focused by a suitable lens 78.

Figure 4:
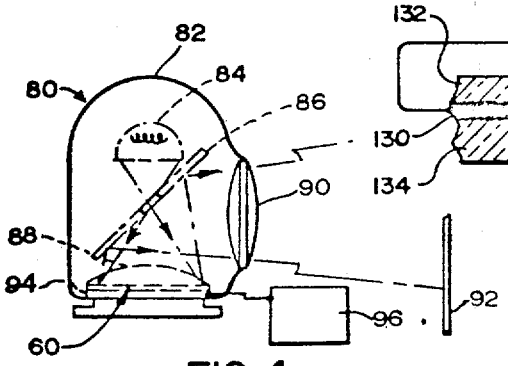
FIG. 4 illustrates a projection device for use with the product of FIG. 3.

The projector of FIG. 4 is designed for the print of FIG. 3. As shown, the projector, which generally is designated 80, includes a housing 82 within which the operating components are mounted and enclosed. These operating components include an incandescent light source 84 having a filament, a rear reflector and a forward lens. This light source focuses the filament at the aperture of a centrally apertured mirror 86. A resulting diverging cone of light illuminates print 60 through a lens 88 which is adjacent to the print and which controls the light paths in such a way as to fill an objective lens 90 with imaging light for a projection screen 92. In operation, print 60 is heated by a support plate 94 under the control of a suitable power supply and monitor circuit 96 in such a way that liquid crystal stratum 66 is cleared at a temperature of approximately 150°F.

It will be understood that in other embodiments of the invention, the gelatino silver halide of photosensitive strata 28 and 70 of FIGS. 1 and 3 are replaced by other photosensitive materials, for example: a ferric composition capable of being developed by potassium ferrocyanide; a diazo material capable of being developed by an alkali; a bichromated material capable of being differentially hardened and dyed; a photopolymerizable material capable of being differentially polymerized by incident light as in U.S. Pat. No. 2,948,611, issued on Aug. 9, 1960, in the name of Arthur L. Barney for Photopolymerizable Composition, Elements and Processes; a photothermographic material capable after photoexposure of being developed by heat, as in U.S. Pat. No. 2,095,839, issued on Oct. 12, 1937, in the name of Samuel E. Sheppard et al., for Photothermograhic Composition; a phototropic material capable of being differentially darkened by light without development, as in U.S. Pat. No. 2,953,454, issued on Sept. 20, 1960, in the name of Elliot Berman for Phototropic Data Storage Capsules and Base Coated Therewith; or a photoconductive material capable of assuming a differential electrostatic charge pattern after being charged in accordance with details to be given below in connection with FIG. 6.

In another alternative embodiment of the present invention, the product of either FIG. 1 or FIG 3 is developed and fixed by a so-called diffusion transfer reversal process of the type disclosed in U.S. Pat. No. 2,543,181, issued on Feb. 27, 1951, in the name of Edwin H. Land for Photographic Product Comprising a Rupturable Container Carrying a Photographic Processing Liquid. In accordance therewith, the product of either FIG. 1 of FIG. 3 is processed by spreading an aqueous alkaline solution of a silver halide developer and a sliver halide solvent between the product and a receiving sheet. Silver is developed in the photosensitive stratum to produce a negative print and a silver halide complex, formed at the photosensitive stratum, migrates to the receiving sheet to produce a positive print. In one modification of this form of the invention, a liquid crystal stratum of the type shown in FIG. 1 or FIG. 3 is provided in the receiving sheet. In another modification of this form of the invention, the liquid crystal material is spread from the container with the processing solution for association with the receiving sheet after photoexposure and during processing. In each of the foregoing embodiments, the concentration of the liquid crystal compound is sufficiently great to ensure the desired degree of diffusion of incident light.

Figure 5:
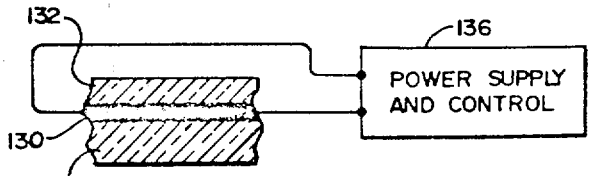
FIG. 5 illustrates an alternative product embodying the present invention.

An alternative product is shown in FIG. 5 as comprising a pair of glass layers 132, 134 between which is sandwiched a mixture 130 of liquid crystal material and electrically conducting material. In one form, the liquid crystal material is a microcrystalline hydrocarbon wax of the type described above. In one form the conducting material is a dispersion of colloidal graphite, which is distributed in a continuous network throughout stratum 130. When electrical power is applied across stratum 130 by a suitable power supply and monitoring control system 136, the resulting heat dissipation in stratum 130 causes an energy change in the form of a temperature rise, in consequence of which the liquid crystal material is transformed from the crystalline to the isotropic phase. A photographic image or the like at one of the outer surfaces of the glass strata 132, 134 thereby is available as a reflection print or as a projection slide. The concentration of liquid crystal compound is sufficiently great to enable conversion from substantial clarity to substantial diffusivity and vice versa, at will.

The present invention thus provides a variety of techniques by which visual images may be observed directly or projected for viewing on a screen. Since certain changes may be made in the disclosure hereof, it is intended that all matter described in the foregoing specification or illustrated in the accompanying drawing, be interpreted in an illustrative and not in a limiting sense.

What is claimed is:

1. A visual sheet product comprising a visual image stratum and a light control stratum, said visual image stratum being composed of a photographic medium selected from the class consisting of photosensitive materials and materials produced by exposing and developing photosensitive materials, said light control stratum being composed of a microcrystalline medium having a crystalline state and an amorphic state as a function of the energy level of said light control stratum, said crystalline state being characterized by uniform diffuse reflection throughout said light control stratum, said amorphic state being characterized by uniform optical clarity throughout said light control stratum, whereby, when said microcrystalline medium is in said crystalline state, said visual image stratum is presented in an opaque format for observation in terms of diffuse light and, when said microcrystalline medium is in said amorphic state, said visual image is presented in a transparent format for projection in terms of condensed light.

2. The photographic product of claim 1 wherein said photographic medium is selected from the class consisting of silver halide material, ferric material, diazo material, bichromated material, photopolymerization material, photothermographic material and electroscopic material.

3. A visual sheet product comprising a visual image stratum and a light control stratum, said visual image stratum being composed of a photographic medium selected from the class consisting of photosensitive materials and materials produced by exposing and developing photosensitive materials, said light control stratum being composed of a liquid crystal medium having a crystalline state and an amorphic state as a function of the energy level of said light control stratum, said crystalline state being characterized by uniform diffuse reflection throughout said light control stratum, said amorphic state being characterized by uniform optical clarity throughout said light control stratum, whereby, when said liquid crystal medium is in said crystalline state, said visual image stratum is presented in an opaque format for observation in terms of diffuse light and, when said liquid crystal medium is in said amorphic state, said visual image is presented in a transparent format for projection in terms of condensed light.

4. The photographic product of claim 2 wherein said photographic medium is selected from the class consisting of silver halide material, ferric material, diazo material, bichromated material, photopolymerization material, photothermographic material and electroscopic material.

5. The photographic product of claim 2 wherein said liquid crystal material is selected from the class consisting of smectic materials, nematic materials and cholesteric materials.

6. A visual sheet product comprising a visual image stratum, a light control stratum, and a support stratum, said visual image stratum being composed of a photographic medium selected from the class consisting of photosensitive materials and materials produced by exposing and developing photosensitive materials, said light control stratum being composed of a microcrystalline medium having a crystalline state and an amorphic state as a function of the energy level of said light control stratum, said crystalline state being characterized by uniform diffuse reflection throughout said light control stratum, said amorphic state being characterized by uniform optical clarity throughout said light control stratum, said support stratum being optically clear, whereby, when said microcrystalline medium is in said crystalline state, said visual image stratum is presented in an opaque format for observation in terms of diffuse light and, when said microcrystalline medium is in said amorphic state, said visual image is presented in a transparent format for projection in terms of condensed light.

7. The visual sheet product of claim 6 wherein said microcrystalline medium is a microcrystalline wax.

8. A visual sheet product comprising a visual image stratum, a light control stratum, and a metallic reflecting stratum, said visual image stratum being composed of a photographic medium selected from the class consisting of photosensitive materials and materials produced by exposing and developing photosensitive materials, said light control stratum being composed of a microcrystalline medium having a crystalline state and an amorphic state as a function of the energy level of said light control stratum, said crystalline state being characterized by uniform diffuse reflection throughout said light control stratum, said amorphic state being characterized by uniform optical clarity throughout said light control stratum, whereby, when said microcrystalline medium is in said crystalline state, said visual image stratum is presented in an opaque format for direct observation in terms of diffuse light and, when said microcrystalline medium is in said amorphic state, said visual image is presented in a transparent format for projection in terms of condensed light transmitted without diffusion through said visual image stratum and said optical control stratum to said reflecting stratum and from said reflecting stratum through said optical control stratum and said visual image stratum to a viewing screen.

9. The visual product of claim 8 wherein said photographic medium is selected from the class consisting of silver halide material, ferric material, diazo material, bichromated material, photopolymerization material, photothermographic material and electroscopic material.

10. The visual product of claim 8 wherein said microcrystalline medium is a microcrystalline wax.

11. A visual sheet product comprising a visual image stratum, a light control stratum, and a metallic reflecting stratum, said visual image stratum being composed of a photographic medium selected from the class consisting of photosensitive materials and materials produced by exposing and developing photosensitive materials, said light control stratum being composed of a liquid crystal medium having a crystalline state and an amorphic state as a function of the energy level of said light control stratum, said crystalline state being characterized by uniform diffuse reflection throughout said light control stratum, said amorphic state being characterized by uniform optical clarity throughout said light control stratum, whereby, when said liquid crystal medium is in said crystalline state, said visual image stratum is presented in an opaque format for direct observation in terms of diffuse light and, when said liquid crystal medium is in said amorphic state, said visual image is presented in a transparent format for projection in terms of condensed light transmitted without diffusion through said visual image stratum and from said optical control stratum to said reflecting stratum and from said reflecting stratum through said optical control stratum and said visual image stratum to a viewing screen.

12. The visual product of claim 11 wherein said photographic medium is selected from the class consisting of silver halide material, ferric material, diazo material, bichromated material, photopolymerization material, photothermographic material and electroscopic material.

13. The visual product of claim 11 wherein said liquid crystal medium is selected from the class consisting of smectic, cholesteric and nematic materials.

14. A process for displaying optical images, said process comprising subjecting, to a first energy level and a second energy level, a laminated structure including a visual image stratum and a light control stratum, said visual image stratum being composed of a photographic medium selected from the class consisting of photosensitive materials and materials produced by exposing and developing photographic materials, said light control stratum being composed of a liquid crystal medium having a crystalline state and an amorphic state as a function of the energy level of said light control stratum, said crystalline state being characterized by uniform diffuse reflection throughout said light control stratum, said amorphic state being characterized by uniform optical clarity throughout said light control stratum, converting said liquid crystal medium to said crystalline state by subjection to said first energy level for presentation in an opaque format for direct observation in terms of diffuse light, and converting said liquid crystal to said amorphic state by subjection to said second energy level for presentation in a transparent format for projection in terms of condensed light.

15. A visual sheet product comprising a visual image stratum and a light control stratum, said visual image stratum being composed of a photographic medium selected from the class consisting of photosensitive materials and materials produced by exposing and developing photosensitive materials, said light control stratum being composed of a liquid crystal medium having a crystalline state and an amorphic state as a function of the energy level of said light control stratum, said crystalline state being characterized by uniform diffuse reflection throughout said light control stratum, said amorphic state being characterized by uniform optical clarity throughout said light control stratum, whereby, when said liquid crystal medium is in said crystalline state, said visual image stratum is presented in an opaque format for observation in terms of diffuse light and, when said light crystal medium is in said amorphic state, said visual image is presented in a transparent format for projection in terms of condensed light, said liquid crystal material being selected from the class consisting of smectic materials, nematic materials and cholesteric materials.

* * * * *